United States Patent [19]

Greenspan

[11] 4,189,385
[45] Feb. 19, 1980

[54] METHOD AND APPARATUS FOR SEPARATING SERUM OR PLASMA FROM THE FORMED ELEMENTS OF THE BLOOD

[76] Inventor: Donald J. Greenspan, 235 Pavilion Ave., Riverside, N.J. 08075

[21] Appl. No.: 793,282

[22] Filed: May 3, 1977

[51] Int. Cl.² .............................................. B01D 33/00
[52] U.S. Cl. .................................... 210/136; 210/359; 210/518; 210/DIG. 23
[58] Field of Search ................. 137/843, 851, DIG. 4; 210/83, 110, 130, 136, 359, 516, 518, DIG. 23, DIG. 24

[56] References Cited

U.S. PATENT DOCUMENTS

| | | | |
|---|---|---|---|
| 2,912,999 | 11/1959 | Kersh | 137/843 X |
| 3,233,610 | 2/1966 | Wade | 137/843 X |
| 3,263,700 | 8/1966 | Toland | 137/851 |
| 3,741,400 | 6/1973 | Dick | 210/DIG. 23 |
| 3,799,342 | 3/1974 | Greenspan | 210/DIG. 23 |
| 3,800,947 | 4/1974 | Smith | 210/359 X |
| 3,865,731 | 2/1975 | Seitz | 210/DIG. 23 |
| 3,932,277 | 1/1976 | McDermott et al. | 210/DIG. 23 |
| 3,954,614 | 5/1976 | Wright | 210/DIG. 23 |
| 3,962,085 | 6/1976 | Liston et al. | 210/DIG. 23 |
| 3,969,250 | 7/1976 | Farr | 210/DIG. 23 |

Primary Examiner—Robert H. Spitzer
Attorney, Agent, or Firm—Woodcock, Washburn, Kurtz & Mackiewicz

[57] ABSTRACT

A separator tube for insertion into a collection tube comprises a tubular member having one end closed by a plug. The plug comprises a valve seating portion having a valve opening therein and a valve head adapted to seat on the seating portion and bias means extending between the seating portion and the valve head to bias the head to the seated position on the seating portion when the separator tube is stationary within the collection tube.

31 Claims, 9 Drawing Figures

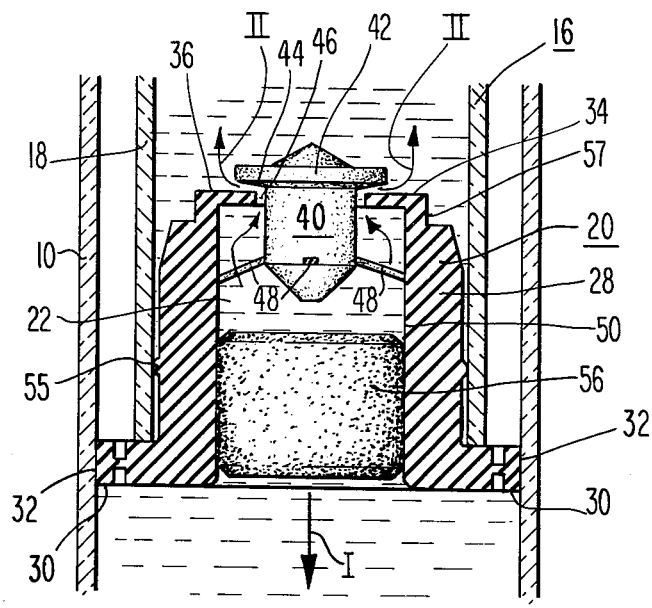
*Fig. 4*
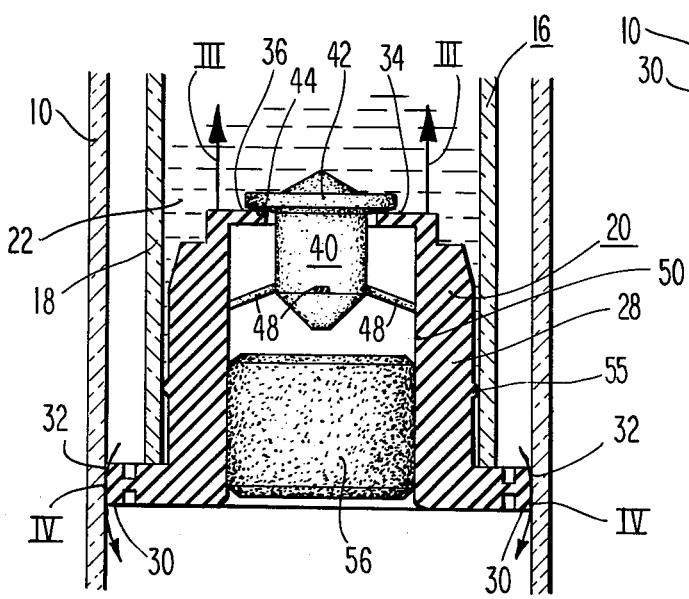
*Fig. 5*
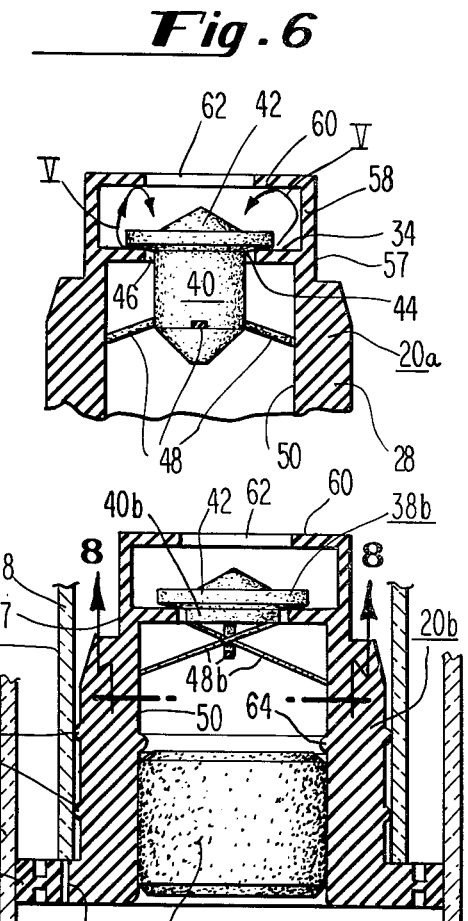
*Fig. 6*
*Fig. 7*
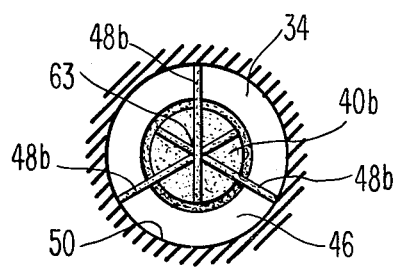
*Fig. 8*
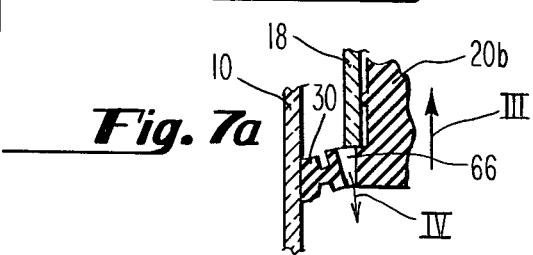
*Fig. 7a*

METHOD AND APPARATUS FOR SEPARATING SERUM OR PLASMA FROM THE FORMED ELEMENTS OF THE BLOOD

BACKGROUND OF THE INVENTION

This invention relates to the separation of the formed elements, i.e., white cells, red cells and platelets of blood, from the serum or plasma of the blood.

Such separation is typically performed by centrifuging a blood sample in a collection tube such that the heavier formed elements of the blood are forced to the bottom or closed end of the collection tube and the lighter plasma or serum of the sample remains on top or toward the open end of the collection tube.

After such separation by centrifugation, it is desirable to physically separate the formed elements of the blood from the serum or plasma in order to prevent the contamination of the serum or plasma. Such contamination can occur as the red blood cells begin to liberate potassium and other contaminants which might interfere with tests performed on the serum or plasma. It is also possible that any fibrin which remains in the sample may, produce some contamination.

In order to achieve this isolation or fluid separation of the formed elements of the blood from the serum or plasma, separator tubes have been utilized. The separator tubes which are adapted to be inserted into a collection tube typically comprise a tubular member having one end closed by a plug which is formed from an elastomeric material. The plug includes a centrally located one-way valve which is forced open as the separator tube is forced downwardly through a blood sample in a collection tube so as to allow the serum or plasma to flow into the separator tube. When the separator tube becomes stationary relative to the collection tube i.e., just before contact with the formed elements of the blood, the one-way valve closes so as to isolate the plasma within the separator tube. The separator tube may then be withdrawn.

It has been found to be particularly desirable to utilize the separator tube in and of itself as a transport device for transporting the serum or plasma to the laboratory from the point at which the blood sample is taken. This requires that the one-way valve at the closed end of the separator tube be essentially leak-proof. My U.S. Pat. Nos. 3,661,265 and 3,799,342 disclose a substantially leak-proof valve which does permit the use of the separator tube as a transport device. The one-way valve disclosed therein essentially relies upon the elastomeric properties of the plug to return the valve to the closed condition, i.e., there is no force or bias acting on the valve when the separator tube is in the stationary position and the valve is closed. Rather, the valve elements, when properly structured, merely contact one another when returning to a natural or unbiased state in which they were originally molded. Proper closure of these valves may be assisted by the tubular member if the inside diameter of the tubular member is slightly smaller than the outside diameter of the plug but the tolerances on the inside diameter of the tubular member are difficult to control particularly where the tubes are extruded.

U.S. Pat. No. 3,954,614 also discloses a valve in a separator tube which is characterized by little or no seating forces when the valve is in the closed position. The same is true with respect to U.S. Pat. No. 3,962,085 wherein the periphery of a disc acts as a valve which is closed when the disc is in the closed position. However, there are no substantial seating forces beyond weight of the blood sample itself. Valves such as those shown in U.S. Pat. Nos. 1,777,408 and 2,191,636 are biased so as to provide a substantial sealing force when in the closed position, but such valves are too complex for use in serum separators.

SUMMARY OF THE INVENTION

It is an object of this invention to provide a serum separator tube with an improved valve.

It is a more specific object of this invention to provide a serum separator tube with a valve which will maintain itself in the closed or seated position.

It is a further specific object of this invention to provide a serum separator to such an improved valve which is relatively easy to manufacture.

In accordance with these and other objects of the invention, the closed end of a separator tube comprises a valve seating portion having a valve opening therein, a movable valve member adapted to seat on said seating portion, and bias means coupled to the valve member and the seating portion for maintaining substantial seating forces between the seating portion and the valve member when the valve member is seated on the seating portion and closes the valve opening.

It is another object of this invention to provide a valve which permits ease in operating the separator tube.

In accordance with this object, the valve member is free to float above the valve opening so as to be freely movable and separable from the valve opening around the entire periphery of the valve opening.

It is another object of this invention to prevent the squirting of serum or plasma from the open end of the separator tube.

In accordance with this object, means are provided adjacent the valve opening for deflecting serum or plasma passing therethrough. In addition, the bias means control deformation of the valve member so as to prevent undesirable, excessive opening of the valve.

In a preferred embodiment of the invention, the bias means comprises at least one flexible strand of elastomeric material which extends from the valve member on the underside of the valve opening to an anchoring location on the valve seating portion. In the closed position, the flexible strand is maintained under tension so as to hold the valve member in the closed position. As the separator tube is forced into a collection tube and plasma or serum pushes against the valve member, the flexible strand stretches and the valve member becomes unseated so as to allow the plasma or serum to flow upward into the separator tube. When the separator tube becomes stationary, the tension on the flexible strand returns the head to the seated position at the valve opening while the strand remains under tension so as to assure the desired closure of the valve.

In the preferred embodiment of the invention, the valve seating portion may comprise a cylindrical section and a seating section at one end of the cylindrical section where the seating section includes the valve opening. The flexible strand extends from the valve member down through the central chamber formed by the cylindrical section and the flexible strand is anchored on the cylindrical section. Preferably, a plurality of flexible strands are utilized which are connected to a wafer-like valve member after extending across the valve opening to the opposte side of the valve opening so as to maximize the control of the valve member, i.e., prevent undesirable deflection of the valve member which could cause faulty closure or squirting of the plasma or serum from the separator tube. In the alternative, the valve member could comprise an elongated body section positioned beneath a head which seats on the valve seating portion with the strands attached thereto.

The preferred embodiment of the invention also comprises a hood located above the valve member for deflecting plasma or serum passing through the valve opening.

The closed end of the separator tube may comprise a plug which is integrally molded so as to include the valve seating portion, the valve member and the bias means. Various elastomeric materials may be utilized in the molded plug so long as the material is capable of achieving the necessary tension on the strands which anchor the valve member to the valve seating portion.

BRIEF DESCRIPTION OF THE DRAWINGS

FIG. 4 is an enlarged sectional view of the separator tube and collection tube of FIG. 1 as the separator tube is inserted into the collection tube;

FIG. 5 is an enlarged sectional view of the separator tube of FIG. 1 wherein the separator tube is being withdrawn from the collection tube;

FIG. 6 is a sectional view of an alternative plug which may be utilized in the apparatus of FIG. 1;

FIG. 7 is a sectional view of yet another plug which is utilized in the apparatus of FIG. 1;

FIG. 7a is a partial sectional view of the plug and separator tube of FIG. 7 being withdrawn from collection tube; and FIG. 8 is a view of the plug of FIG. 7 taken along line 8—8 of FIG. 7.

DETAILED DESCRIPTION OF PREFERRED EMBODIMENTS

Figure 1:
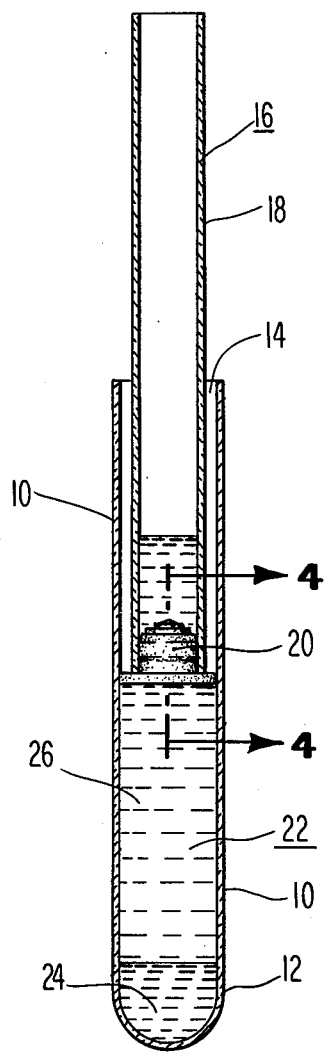
FIG. 1 is a sectional view of a preferred embodiment of the invention comprising a separator tube and a collection tube.

FIG. 1 discloses separation apparatus comprising a collection tube 10 having a closed end 12 and an open end 14. As shown, the separator tube 16 has been inserted into the collection tube 10 through the open end 14. The separator tube 16 comprises a tubular member 18 which is closed at one end by a plug 20.

The collection tube 10 is partially filled with a sample 22 which has been subjected to separating, e.g., centrifugation, so as to move the formed elements of the blood 24 to the closed end 12 of the collection tube 10 while the serum or plasma 26 is located above the formed elements 24. As shown in FIG. 1, the separator tube 16 has been inserted into the collection tube 10 down through the serum or plasma 26 to a point where the serum or plasma has entered the separator tube 18 through a novel valve mechanism in the plug 20 which will now be described in detail with reference to FIGS. 2-5.

Figure 2:
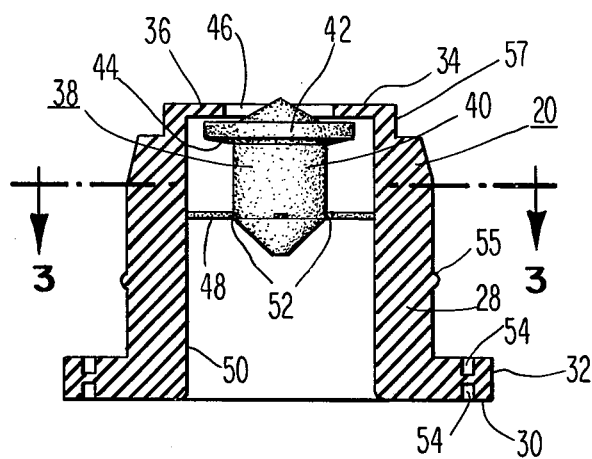
FIG. 2 is a sectional view of the valve member incorporated in the separator tube of FIG. 1.

As shown in FIG. 2, the plug 20 comprises a seating portion 28 including substantially cylindrical body which is terminated at one end by a flange 30 which is adapted to form a seal along the wall of the collection tube 10 at a sealing surface 32. The other end of the seating portion 28 comprises a radially inwardly directed annular flange 34 which is adapted to form a valve seat along the surface 36 for a movable valve member 38. As shown in FIG. 2, the valve member 38 comprises a body portion 40 terminated by a sealing head portion 42 which is adapted to seat on the surface 36 along a surface 44 when the sealing portion or head 42 is pushed through an opening 46 in the flange 34 as shown in FIGS. 4 and 5.

Figure 3:
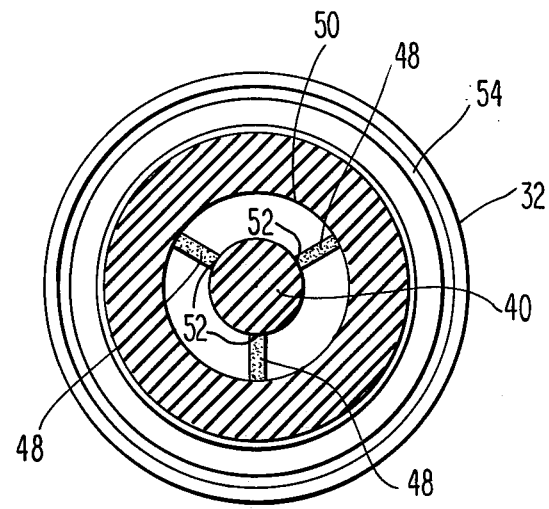
FIG. 3 is a sectional view taken along line 3—3 of FIG. 2.

In order to provide a closing bias on the valve member 38 which is independent of the diameter of the tubular member 18, resilient strand or strut members 48 are attached to the interior walls 50 of the seating portion 28 of the plug 20. As shown in FIG. 3, three such struts or strands 48 may be utilized which are evenly spaced around the wall 50 and the valve member 38 at points of attachment 52 so as to assure that the appropriate seal will be formed between the sealing surface 44 and the seating surface 36 shown in FIG. 2.

FIGS. 2 and 3 show an integrally molded plug 20 which comprises an elastomeric material such as Kraton or rubber. As shown in FIG. 2, the valve member 38 is in the unbiased position since there is no tension on the strands 48. However, once the head or sealing portion 42 is forced through the opening 46 as shown in FIGS. 4 and 5, the strands 48 are under tension and store energy so as to force the sealing surface 44 into contact with the seating surface 36 when the separator tube is in the stationary position as shown in FIG. 1.

As also shown in FIGS. 2 and 3, the flange 30 comprises annular relieved areas 54 located on opposite sides of the flange 30. The relieved areas 54 allow the sealing surface 32 to be extended radially outwardly or retracted radially inwardly so as to accommodate different internal diameters in the collection tube 10 as shown in FIG. 1. FIG. 2 also shows an annular bead 55 which is adapted to form a seal with the separator tube 16 as shown in FIGS. 4 and 5. By relying on the bead 55 to form the necessary seal, the tolerances on the diameter of the tubular member 18 as shown in FIGS. 4 and 5 becomes less critical. Similarly, an annular recess 57 is provided adjacent the flange 34 so as to preclude contact between the tubular member 18 and the flange 34 which could impair proper operation of the valve.

Referring now to FIGS. 4 and 5, the plug 20 is shown in the operable position, i.e., the head 42 is located above the seating surface 36. As also shown in FIGS. 4 and 5, a filter 56 is inserted into the central cavity formed by the wall 50 of the seating portion 28 so as to filter out fibrin and any formed elements of blood which remain suspended in the plasma or serum as the separator tube 16 is inserted into the collection tube 10 in the direction indicated by arrow I as shown in FIG. 4. As the separator tube 16 is pushed in the direction indicated by the arrow I, the head 42 is forced upwardly off the seating surface 36 so as to permit the filtered serum or plasma to flow around the valve body 40 and the head 42 and through the opening 46 in the flange 34 as depicted by arrows II.

In FIG. 5, the separator tube 16 is being withdrawn from the collection tube 10 in the direction indicated by the arrows III. Under these circumstances, the seating surface 44 of the head 42 is in sealing engagement with sealing surface 36 so as to prevent the flow of the serum or plasma 22 through the valve opening 46. As the separator tube 16 is withdrawn from the collection tube 10, air passes between the sealing surface 32 and the collection tube 10 as depicted by the arrows IV.

Reference will now be made to FIG. 6 wherein a modification of the plug of FIGS. 1-5 is shown. More particularly, the seating portion 28 includes a hood 58 adjacent the valve opening 46 and the head 42. The hood 58 includes a radially inwardly directed flange 60 and a central opening 62. The flange 60 serves to deflect the serum or plasma which flows through the opening 46 so as to avoid any squirting of the plasma out the end of the separator tube (not shown in FIG. 6). The arrows V depict the deflection of the serum or plasma. The remainder of the plug 20a shown in FIG. 6 is substantially identical to the plug 20 shown in detail in FIGS. 2-5.

Referring now to the plug shown in FIG. 7, a plug 20b comprises a modified valve member 38b having substantially no body but merely the head 42. The struts or strands 48b are attached to a wafer-like projection 40b. Due to the forces exerted by the strands 48b at the periphery of the head 42, the head 42 of the valve member 38b is particularly resistant to any deformation which could result in squirting of the plasma or serum through the opening 62. In other words, these forces exerted by strands tend to maintain the valve head 42 in the shape shown in FIG. 7 and this is also particularly important in preventing the head 42 from becoming jammed open in the opening 46. As shown in FIG. 8, the strands 48b extend across the valve opening 46 from the wall 50. This assures that the strands 48b do not rub or become hung up on the flange 34 at the edge of the opening 46 which might occur if the strands 48b did not cross to the opposite side of the opening 46. It will be appreciated that even the projection 40b may be eliminated and the strands attached directly to the head 42. In order to avoid interference at point 63, the strands 48b are attached at different elevations on the wall 50.

The plug 20b of FIG. 7 also comprises an annular projection or bead 64 located on the wall 50 just above the filter 56. The bead 64 assures that the filter is not forced upwardly toward the valve member 38b thereby preventing interference therewith. An additional annular bead 55 on the body 28 is also provided to form the seal with the tubular member 18. In addition, a plurality of check valves 66 extend through the flange 30 beneath the tubular member 18. These valves are closed when the separator tube 16 is inserted into the collection tube 10 as shown in FIG. 7, but opened as the separator tube 18 is removed from the collection tube 10 as shown in FIG. 7a so as to allow air to enter the collection tube. Such check valves 66 are disclosed in U.S. Pat. No. 3,954,614.

As utilized herein, the phrase valve seating portion is not limited to that portion of the structure on which the valve actually seats. Rather, the valve seating portion comprises a body section forming a hollow chamber and a seating section at one end of the body section.

A method for making the plugs 20, 20a and 20b as disclosed in copending application Ser. No. 793,208 filed May 3, 1977 is incorporated herein by reference as if set forth in full.

Although a specific embodiment of the invention has been shown and described, it will be understood that other embodiments and modifications may be utilized without departing from the true spirit and scope of the invention as set forth in the appended claims. For example, it is possible to utilize check valves in the flange 30 of the type disclosed in my aforesaid U.S. Pat. Nos. 3,799,342 and 3,661,265. Other features incorporated in those patents may also be incorporated in the apparatus claimed herein.

What is claimed is:

1. A separator tube adapted to be pushed into a collection tube containing blood for separating serum or plasma from the formed elements of the blood, said separator tube comprising:
   a tubular member,
   means adapted to form a seal with the collection tube as the separator tube is pushed into the collection tube,
   a valve seating portion having a valve opening therein, said valve opening permitting serum or plasma to flow into said tubular member when the separator tube is plunged into the collection tube,
   a movable valve member adapted to seat on said seating portion on one side of said opening so as to close said valve opening in the presence of serum or plasma in said tubular member,
   bias means comprising at least one flexible strand maintained under tension connected between said valve member and said valve seating portion on the other side of said opening for maintaining a substantial seating force on said valve member when said valve opening has closed, and
   said valve seating portion, said valve member and said bias means being integrally molded to form a unitary structure.

2. The separator tube of claim 1 wherein said valve member comprises an elastomeric material adapted to be pushed through said opening so as to relieve the tension on said flexible strand.

3. The serum separator tube of claim 1 wherein said valve member comprises a head portion which floats above said valve opening when open so as to be freely movable and separable from said valve opening around the entire periphery.

4. The separator tube of claim 3 wherein said at least one strand comprises an elastomeric material connecting said head to said valve seating portion, said strand being maintained under tension.

5. The separator tube of claim 4 wherein said valve seating portion comprises a body section forming a hollow chamber and a seating section at one end of said body section, said seating section having said valve opening therein, said strand being attached to said body section within said hollow chamber.

6. The separator tube of claim 5 further comprising filter means lodged in said hollow chamber, said body section including a projection extending into said hollow chamber above said filter means to prevent said filter means from moving upward and interfering with said head and said at least one strand.

7. The separator tube of claim 4 wherein said head portion comprises an elastomeric material adapted to be pushed through said valve opening so as to relieve the tension on said strand.

8. The separator tube of claim 7 including more than one said strand connecting said head to said body section.

9. The separator tube of claim 8 wherein said strands extend from said body section and cross said valve opening.

10. The separator tube of claim 8 wherein said valve member further comprises a central body portion between said head and said strands.

11. The separator tube of claim 1 further comprising hood means located adjacent said valve opening for deflecting serum or plasma passing through said valve opening.

12. The separator tube of claim 11 wherein said hood means comprises a flange forming an opening located above said valve opening, said flange deflecting said serum or plasma prior to passage through said central opening.

13. The separator tube of claim 1 wherein one end of said tubular member comprises a separate plug which is inserted into an open end of said tubular member, said plug comprising said valve seating portion, said valve member and said bias means.

14. The separator tube of claim 13 wherein said plug comprises an elastomeric material.

15. The separator tube of claim 13 wherein said plug further comprises an integrally molded hood comprising an inwardly directed flange forming an opening above said valve opening.

16. The separator tube of claim 13 wherein said plug comprises an annular recess around said valve opening so as to space said plug from said tubular member at said valve opening and thereby prevent said tubular member from affecting the operation of said valve member at said valve opening.

17. The separator tube of claim 13 wherein said plug comprises at least one sealing bead projecting outwardly for forming a seal with said tubular member.

18. The separator tube of claim 13 wherein said plug further comprises a sealing flange extending radially outwardly beyond said tubular member so as to form said seal with the collection tube.

19. The separator tube of claim 18 wherein said plug further comprises check valve means associated with said flange for preventing said head from being pulled into said valve opening as the separator tube is removed from a collection tube.

20. The separator tube of claim 1 wherein the force supplied by said bias means for maintaining said valve member closed in substantially independent of said tubular member.

21. The separator tube of claim 1 wherein said valve member comprises a head, said valve seating portion comprises a body section having said valve opening therein and a body section forming a hollow chamber below said valve opening, and said at least one strand extending from said valve member and through said hollow chamber, said at least one strand being attached to said body section and said valve member and maintained under tension.

22. The separator tube of claim 21 wherein said at least one strand comprises a plurality of strands.

23. The separator tube of claim 21 wherein said valve member comprises a head portion adapted to float above said valve opening when open so as to be freely movable and separable from said valve opening around the entire periphery.

24. The separator tube of claim 21 wherein said valve member comprises an elastomeric material adapted to be pushed through said valve opening so as to relieve the tension on said bias member.

25. The separator tube of claim 21 further comprising filter means lodged in said hollow chamber of said body section, said body section including a projection extending into said chamber so as to prevent said filter means from moving upward into a position for interference with said head.

26. The separator tube of claim 1 wherein said bias means is formed of elastomeric material, said bias means being maintained in a state where energy is stored in said elastomeric material when said valve opening is closed, said energy being stored after the molding of said seating portion, said valve member and said bias means.

27. The separator tube of claim 26 wherein said bias means is maintained under tension in said stored energy state.

28. The separator tube of claim 27 wherein said means adapted to form said seal is also integrally molded with said valve seating portion, said valve member and said bias means.

29. The separator tube of claim 28 wherein said means adapted to form said seal, said valve seating portion, said valve member and said bias means comprise a plug separable from said tubular member.

30. A separator tube adapted to be pushed into a collection tube containing blood for separating serum or plasma from the formed elements of the blood, said separator tube comprising:
   a tubular member,
   means adapted to form a seal with the collector tube as the separator tube is pushed into the collection tube,
   a valve seating portion having a valve opening therein, said valve opening permitting serum or plasma to flow into said tubular member when the separator tube is plunged into the collection tube,
   a movable valve member adapted to seat on said seating portion on one side of said opening so as to close said valve opening in the presence of serum or plasma in said tubular member, and
   bias means comprising at least one flexible strand connected between said valve member and said valve seating portion on the other side of said opening for maintaining a substantial seating force on said valve member when said valve opening is closed, said bias means being maintained under tension when said valve member is seated on said valve seating portion so as to close said valve opening, said valve member being adapted to pass through said opening so as to relieve the tension on said bias means without being detached from said valve seating portion.

31. A separator tube adapted to be pushed into a collection tube containing blood for separating serum or plasma from the formed elements of the blood, said separator tube comprising:
   a tubular member;
   means adapted to form a seal with the collection tube as the separator tube is pushed into the collection tube;
   a valve seating portion having a valve opening leading from a valve seating section to a hollow chamber, said chamber and said valve opening permitting serum or plasma to flow therethrough into said tubular member when the separator tube is plunged into the collection tube;
   a movable valve member adapted to seat on a valve seating section and including a portion extending at least into said opening; and
   bias means comprising at least one flexible strand maintained under tension and connected between said valve member portion and said chamber for maintaining a substantial seating force on said valve member in the presence of serum or plasma in said tubular member.

* * * * *